United States Patent [19]

Fitzgerald et al.

[11] Patent Number: 4,747,507

[45] Date of Patent: May 31, 1988

[54] HOLDER FOR A CONTAINER

[75] Inventors: Louis T. R. Fitzgerald, Williamstown; Roland P. Como, Gisborne, both of Australia

[73] Assignee: Plastic Pipe Fabrication Pty. Ltd., Williamstown, Australia

[21] Appl. No.: 862,459

[22] Filed: May 12, 1986

[30] Foreign Application Priority Data

May 17, 1985 [AU] Australia .............................. 42634/85

[51] Int. Cl.⁴ ............................................ B65D 23/00
[52] U.S. Cl. ................................................. 220/85 H
[58] Field of Search ................ 220/85 CH, 85 H, 260, 220/284

[56] References Cited

U.S. PATENT DOCUMENTS

| | | | |
|---|---|---|---|
| 3,090,478 | 5/1963 | Stanley | 220/85 H X |
| 3,941,237 | 3/1976 | MacGregor, Jr. | 220/85 H X |
| 4,534,391 | 8/1985 | Ventimiglia et al. | 220/85 H X |
| 4,671,424 | 6/1987 | Byrns | 220/85 H X |

FOREIGN PATENT DOCUMENTS 160871 1/1954 Australia .

Primary Examiner—Steven M. Pollard
Attorney, Agent, or Firm—Knobbe, Martens, Olson & Bear

[57] ABSTRACT

A moulded container for a bottle, the container is of double wall construction so as to provide good thermal insulation and the bottom of the container has a castellated opening or recess into which the crown seal of a bottle can be inserted for facilitating removal of the crown seal of the bottle. Also disclosed is a novel injection moulding die for forming a double walled container.

8 Claims, 4 Drawing Sheets

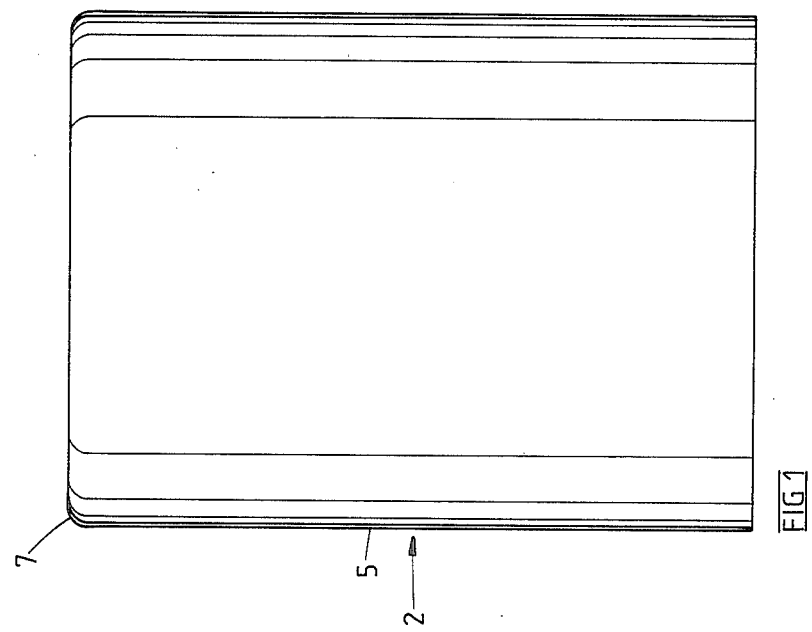
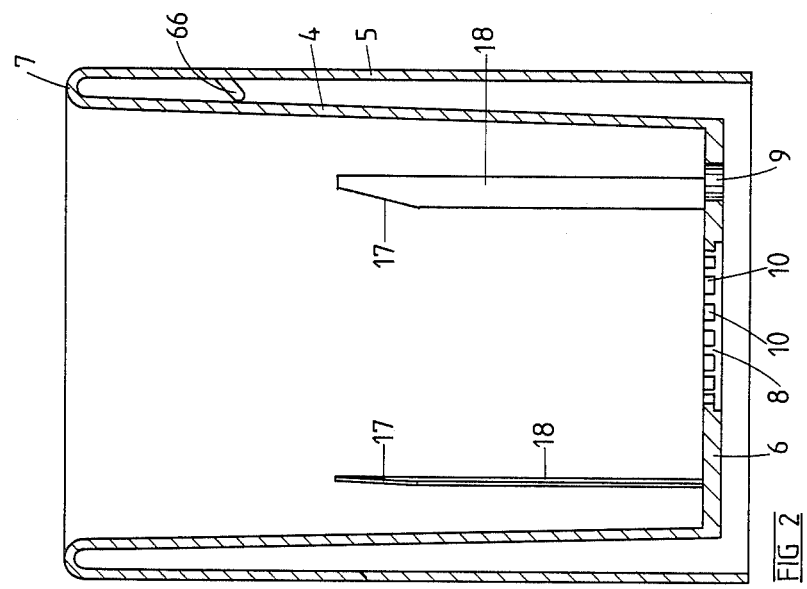

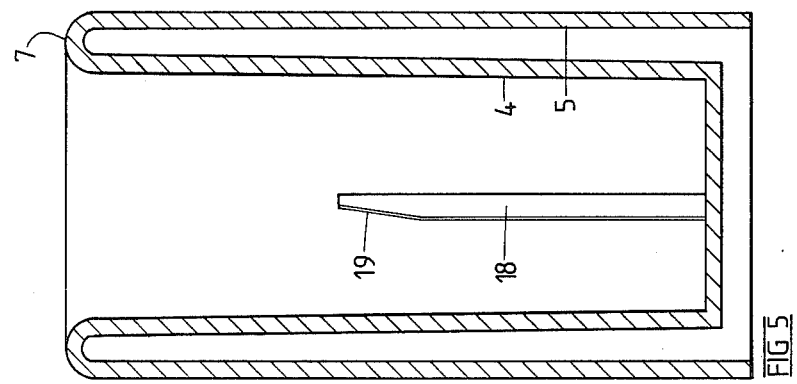
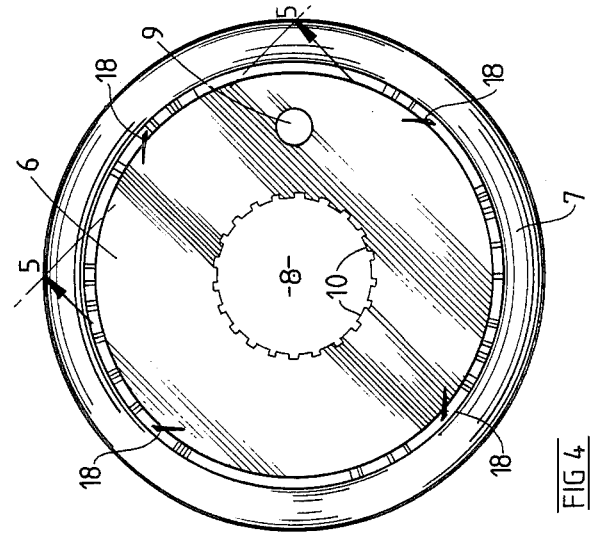
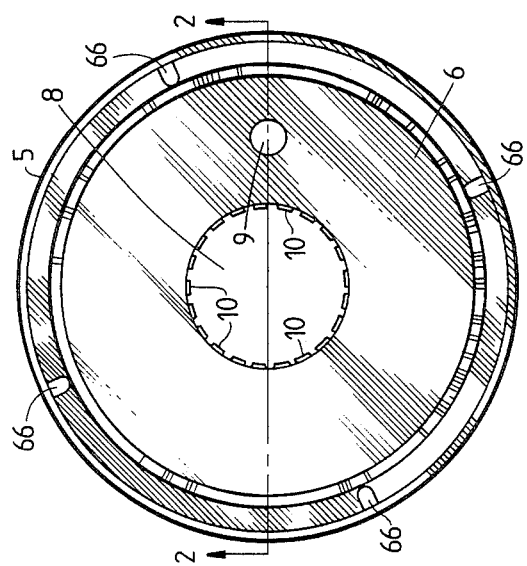

HOLDER FOR A CONTAINER

This invention relates to a holder for a container.

More particularly, the invention relates to an insulated holder for a container having a screw top. Some containers commonly used for softdrinks and beer have a crown seal top which is mounted on a bottle such that it can be removed using a conventional can opener or alternatively can be removed by unscrewing from thread formations provided on the top. A considerable torque needs to be applied to the top in order to effect unscrewing. An object of the present invention is to provide means facilitating unscrewing of the container top and for providing an insulated holder for receipt of the container.

According to the present invention there is provided a holder for a container having a screw top, said holder comprising a body moulded from heat insulating material and including a recess for receiving the container so as to heat insulate the container when placed therein, said body having integrally formed therewith a top opening formation, having a shape generally complementary to the screw top such that when the screw top is positioned in the formation, the top cannot be turned within the formation whereby rotation of the holder relative to the container causes unscrewing of the top from the container.

Preferably the holder is formed from relatively rigid plastics material. Preferably further the plastics material is foamed.

Preferably the body comprises a hollow cylindrical shape formed with a blind opening, the top opening formation being located in the bottom of the body. The formation preferably comprises a circular opening having generally axially extending ribs thereon which cooperate with complementary recesses or dents in a crown seal top to be removed.

The invention will now be further described with reference to the accompanying drawings, in which:

FIG. 1 is a side view of a preferred embodiment of the invention,

FIG. 2 is a longitudinal cross-section along line 2—2,

FIG. 3 is an underside view,

FIG. 4 is a top plan view,

FIG. 5 is section along line 5—5,

Figure 6:
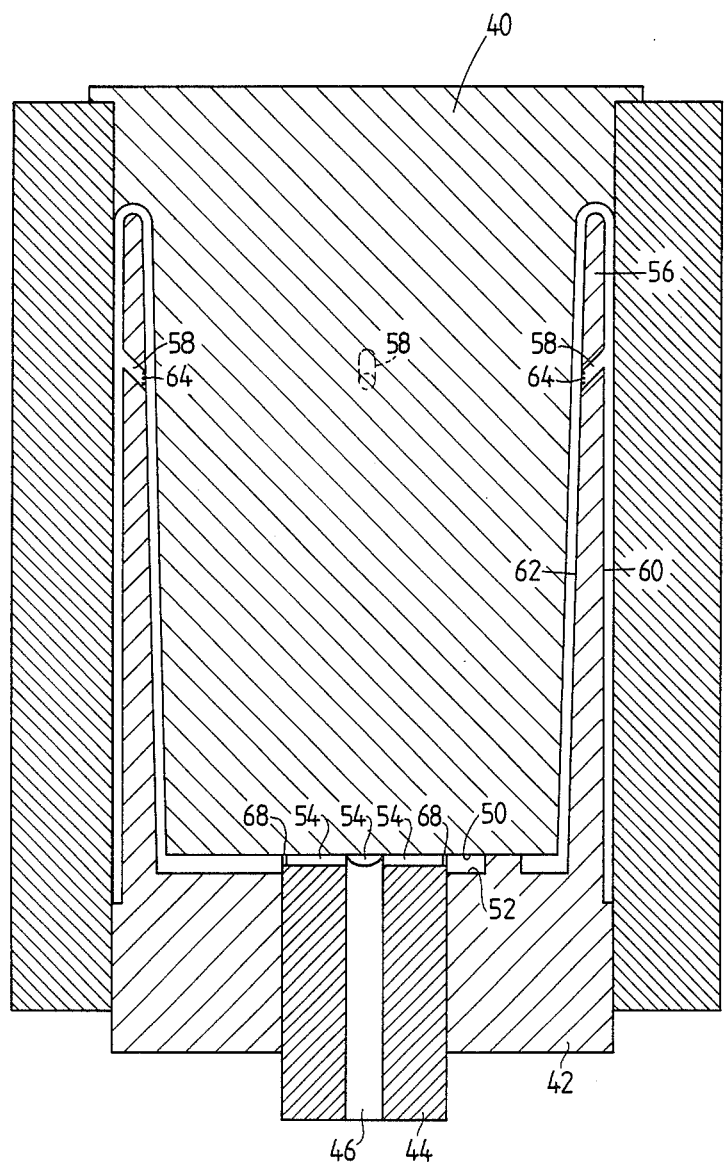
FIG. 6 shows a schematic cross-section through a die for forming the container.

The container illustrated in FIGS. 1 to 5 comprises a generally cylindrical shaped body 2 having inner and outer sidewalls 4 and 5 and a bottom 6. The upper portions of the sidewalls 4 and 5 are connected together by a rounded lip 7. The lower portion of the sidewall 5 extends below the level of the bottom 6 so as to form an annular support for the container. The inner sidewalls taper towards the bottom 6 by about 6 mm in diameter. The bottom 6 is formed with a small drainage hole 9.

Located centrally of the bottom 6 is a hole 8 which is provided with ribs 10 which extend generally in the axial direction of the cylindrical body. As can be seen from FIGS. 1 and 3, the hole 8 is slightly tapered from the lower surface of the bottom to the inner surface so as to facilitate entry of a crown seal top of a bottle (not shown).

In the preferred arrangement of the invention, the diameter of the hole 8 at the plane of the lower surface of the bottom 6 is 29 mm so that the bore can receive crown seals of conventional size. The ribs 10 fall generally within the grooves, normally found on the crown seal so that a rotation of the body 2 relative to the bottle will cause the crown seal to be removed by unscrewing from the threads provided on the upper part of the neck of the bottle.

The bottle can then if it is of the right size, be placed within the hollow interior of the sidewalls 4 so as to assist in keeping the container heat insulated from the atmosphere. The air gap between the sidewalls 4 and 5 also assists in heat insulation. The inner diameter of the sidewall 4 is chosen to be about 73 mm at the top and about 63 mm near the bottom so that the container can receive beer bottles of a similar diameter. The axial length of the body is chosen to be about 110 mm so that the neck of commonly used beer bottles will project from the upper part of the holder when the bottle is placed therein.

As best seen in FIG. 2, the inner surface of the sidewall 4 is formed with four longitudinally extending ribs 18. The ribs 18 project obliquely from the sidewall 4 and include a tapered upper edge 19 to facilitate passing of the bottle on insertion thereof into the container. The ribs 18 are resilient and will in use engage the side walls of the bottle even if the bottle is somewhat irregular in its circumference. This assists to some extent in keeping the bottle snugly held in the holder.

In the preferred embodiment the container is injection moulded from polypropylene, the thickness of the sidewalls 4 and 5 being about 1.5 mm and the thickness of the bottom 6 being about 3 mm.

In an alternative embodiment, the sidewalls 4 and 5 may comprise a solid wall. In this case the body is preferably injection moulded from blown polyethylene or blown polypropylene. The wall thickness being from about 5 mm to 10 mm so as to provide good thermal insulation.

Figure 7:
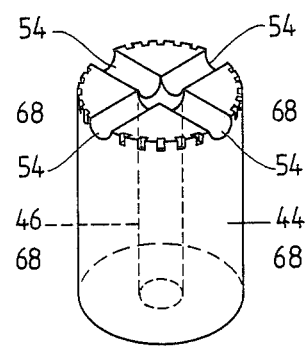
FIG. 7 is a perspective view through part of the die.

FIGS. 6 and 7 illustrate the preferred form of injection moulding die for forming the container. The die essentially comprises four parts as follows: a central cylindrical portion 40, a skirt portion 42, outer block 44, and cylindrical supply portion 44. The cylindrical supply portion 44 has a central bore 46 which is supplied with molten plastics material from an injection moulding machine (not shown) in a manner known per se. The inner end face 48 of the portion 44 bears against end face 50 which defines the inside of the bottom 6 of the container. The adjacent face 52 of the skirt portion 42 defines the lower surface of the bottom 6. The face 48 of the portion 44 includes four recesses 54 through which the molten plastics material enters the space between the parts of the die. As is well known, the plastics material is injected at very high pressure say of the order of 20,000 psi and thus the free end region 56 of the skirt portion 42 is vulnerable to deformation under these pressures and temperatures. Indeed it has been found that the end portion 56 is susceptible to outward flaring caused by the plastics material moving from the inside surface of the portion 56 to the outer region so as to form the outer side wall 5 of the container. In accordance with the invention this problem has been solved by providing pressure relief ducts 58 through the skirt portion 42 as shown. During the injection stage, the molten plastics material is free to pass through the ducts and therefore tends to equalise the pressure on either side of the end portion 56 thereby substantially avoiding the possibility of deformation of the end portion. It will be appreciated that on curing of the plastics material plugs 66 of plastics material form in the ducts 48 and these must be ruptured on removal of the container from the die. In order to facilitate removal of the container the ducts 58 are tapered from the inside surface 62 to the outside surface 60 of the skirt 42. Thus the plugs of plastics material will tend to rupture at lines of weakness 64 thereby leaving the plugs 66 depending from the inner face of the outer wall 5 of the container, as seen in FIGS. 2 and 3.

The side wall of the cylindrical portion 44 adjacent to the end face 48 is formed with recesses 68 which form the ribs 10 in the hole 8. The plastics material which solidifies in the recesses 54 forms a removable sprue.

In a modified arrangement the inclination of the ducts 58 could be reversed in which case the direction of tapering would also be reversed. The plug 66 will of course tend to rupture at their weakest point which in this case is again downstream relative to the direction of movement relative to the direction in which the container is withdrawn from the skirt portion 32. After rupture the plugs will defend from the inner wall 4.

Many modifications will be apparent to those skilled in the art without departing from the spirit and scope of the invention.

We claim:

1. A holder for a container having a screw top, said holder comprising a body moulded from heat insulating material and including a recess for receiving the container so as to heat insulate the container when placed therein, said body having integrally formed therewith a top opening formation having a shape generally complementary to the screw top such that when the screw top is positioned in the formation, the top cannot be turned within the formation whereby rotation of the holder relative to the container causes unscrewing of the top from the container.

2. A holder as claimed in claim 1 wherein said body has inner and outer sidewalls, said recess being defined by the inner sidewall, said recess including a bottom which is formed at a lower edge of the inner sidewall.

3. A holder as claimed in claim 2 wherein said top opening formation is formed in said bottom.

4. A holder as claimed in claim 3 wherein said formation comprises a hole formed through said bottom with ribs projecting inwardly for engagement with the top of the container.

5. A holder as claimed in claim 2 including resilient ribs projecting inwardly from the inner sidewall.

6. A holder as claimed in claim 5 wherein the ribs extend in an axial direction relative to the inner sidewall and project obliquely relative to normal to the inner surface of the inner sidewall.

7. A method of moulding a container as defined in claim 2 by using an injection moulding die having an annular recess and a skirt portion extending therein and defining a cavity for forming the inner and outer sidewalls, said method being characterised by the step of forming pressure reducing ducts through said skirt portion near the free end thereof so as to permit flow of plastics material therethrough to thereby equalise pressure on the inner and outer sides of the skirt portion during moulding.

8. A method as claimed in claim 7 wherein said container is separated from the die by causing the skirt portion to be withdrawn from between the inner and outer sidewalls by causing movement of the container and skirt portion in a first direction and wherein said ducts are provided at angles inclined to radial directions and tapering through the skirt portion so as to form plugs therein which rupture at a trailing edge thereof relative to said movement of said container in said first direction to thereby facilitate removal of the container from the skirt portion.

* * * * *